(12) United States Patent
Nagase et al.

(10) Patent No.: US 8,364,391 B2
(45) Date of Patent: Jan. 29, 2013

(54) NAVIGATION SYSTEM

(75) Inventors: Kenji Nagase, Okazaki (JP); Hiroki Ishikawa, Okazaki (JP); Hiroshi Tomita, Okazaki (JP); Takayasu Nakada, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 1156 days.

(21) Appl. No.: 11/905,740

(22) Filed: Oct. 3, 2007

(65) Prior Publication Data

US 2008/0091339 A1    Apr. 17, 2008

(30) Foreign Application Priority Data

Oct. 12, 2006  (JP) ................................ 2006-278710

(51) Int. Cl.
*G01C 21/00*   (2006.01)
(52) U.S. Cl. ........ 701/400; 701/117; 701/414; 701/415; 340/991; 340/993
(58) Field of Classification Search ............... 701/24, 701/29, 36, 117, 119, 118, 200, 208, 400, 701/414, 415, 423; 455/412.1, 412.2, 456; 340/905, 989, 990–993, 995.13; 342/125, 342/454, 458, 461, 357.09
See application file for complete search history.

(56) References Cited

U.S. PATENT DOCUMENTS

| | | | | |
|---|---|---|---|---|
| 6,061,625 | A * | 5/2000 | Fastenrath | 701/117 |
| 6,704,564 | B1 * | 3/2004 | Lange et al. | 455/412.1 |
| 7,246,007 | B2 * | 7/2007 | Ferman | 701/200 |
| 7,729,335 | B2 * | 6/2010 | Lee et al. | 370/349 |
| 2005/0093720 | A1 * | 5/2005 | Yamane et al. | 340/995.13 |
| 2005/0216147 | A1 * | 9/2005 | Ferman | 701/29 |
| 2008/0140305 | A1 * | 6/2008 | Kim et al. | 701/117 |

FOREIGN PATENT DOCUMENTS

| | | |
|---|---|---|
| DE | 196 38 069 A1 | 3/1998 |
| EP | 1 146 495 A2 | 10/2001 |
| GB | 2 361 794 A | 10/2001 |
| JP | A-11-032374 | 2/1999 |
| JP | A-11-160411 | 6/1999 |
| JP | A-2004-265002 | 9/2004 |
| JP | A-2005-006064 | 1/2005 |
| JP | A 2006-146645 | 6/2006 |

OTHER PUBLICATIONS

Japanese Patent Office, Notification of Reason for Rejection mailed Mar. 8, 2011 in Japanese Patent Application No. 2006-278710 w/Partial English-language Translation.

* cited by examiner

*Primary Examiner* — Hussein Elchanti
*Assistant Examiner* — Rami Khatib
(74) *Attorney, Agent, or Firm* — Oliff & Berridge, PLC

(57) ABSTRACT

A navigation system includes an information center and a navigation device installed in a probe vehicle. The information center stores limiting information for specifying a content of probe information in accordance with predefined factors, specifies a predefined factor corresponding to a navigation device, selects the limiting information based on the specified predefined factor, transmits the selected limiting information to the navigation device, and receives the corresponding probe information transmitted from a navigation device. The navigation device receives the limiting information from the information center, collects probe information, selects only the probe information specified by the received limiting information for transmission to the information center, and transmits the selected probe information to the information center.

5 Claims, 12 Drawing Sheets

| PERIOD | GENERAL AREA | SPECIFIC AREA | | | |
|---|---|---|---|---|---|
| | | TOKYO AREA | | AICHI AREA | |
| | | CARS 1 TO 100: PATTERN 2 | CARS 101 OR MORE: PATTERN 8 | CARS 1 TO 1000: PATTERN 3 | CARS 1001 OR MORE: PATTERN 8 |
| 2006.10.1~ 2006.10.31 | PATTERN 1 | | | | ... |
| 2006.11.1~ 2006.11.31 | PATTERN 4 | HOKKAIDO AREA | | HOKKAIDO AREA | |
| | | PATTERN 5 | | PATTERN 7 | |
| 2006.12.1~ 2006.12.31 | | HOKKAIDO AREA | | ... | |
| | | PATTERN 6 | | | |
| 2007.1.1~ 2007.1.31 | | ... | | ... | |
| 2007.2.1~ 2007.2.28 | | ... | | ... | |
| ... | | | | | |

FIG. 3

| COLLECTING PATTERN | CONTENT OF TRANSMISSION DATA |
|---|---|
| PATTERN 1 | ABS ALL DATA EXCEPT FOR OPERATING STATUS OF ABS AND OUTSIDE/ROAD SURFACE TEMPERATURES |
| PATTERN 2 | ONLY DATA FOR TRAFFIC CONGESTION INFORMATION (TRAVELING TIME, DEGREE OF CONGESTION, DRIVING SPEED FOR LINKS) |
| PATTERN 3 | ALL DATA EXCEPT FOR OPERATING STATUS OF ABS ON SATURDAYS, SUNDAYS AND HOLIDAYS |
| PATTERN 4 | ALL DATA EXCEPT FOR OPERATING STATUS OF ABS |
| PATTERN 5 | ALL DATA EXCEPT FOR DEGREE OF CONGESTION AND OPERATING STATUS OF ABS |
| PATTERN 6 | ONLY DATA FOR TRAFFIC CONGESTION INFORMATION (TRAVELING TIME, DEGREE OF CONGESTION, DRIVING SPEED FOR LINKS) ON NATIONAL EXPRESSWAYS, CITY EXPRESSWAYS, NATIONAL ROADS OF SINGLE/DOUBLE DIGIT NUMBERS ON WEEKDAYS |
| PATTERN 7 | ALL DATA INCLUDING OPERATING STATUS OF ABS |
| PATTERN 8 | STOP TRANSMITTING ALL DATA OF THE DAY |
| ... | ... |

FIG. 4

NAVIGATION SYSTEM

INCORPORATION BY REFERENCE

The disclosure of Japanese Patent Application No. 2006-278710 filed on Oct. 12, 2006, including the specification, drawings and abstract is incorporated herein by reference in its entirety.

BACKGROUND

1. Related Technical Fields

Related technical fields include navigation systems. Specifically, related technical fields include navigation systems in which a navigation device installed on a probe car transmits probe information to an information center.

2. Description of the Related Art

Various types of navigation systems are known in which a navigation device installed on a probe car transmits collected probe information to an information center via, for example, a mobile telephone signal.

When receiving the information of a starting position, a destination, and a driving route from the navigation device installed in the probe car, the information center determines information (hereinafter called "subject information") to collect, such as areas and time of driving data, for the navigation device to collect based on information such as event information, traffic accident information, forecasted traffic congestion information, an amount of collected information anticipated, an amount of information accumulated, and weather information. The information center then instructs the navigation device to collect the decided subject information. The navigation device collects and transmits the collected subject information to the information center. Such a navigation system is disclosed, for example, in Japanese Patent Application Publication No. JP-A-2006-146645, paragraphs [0006] to [0029] and FIGS. 1 to 6.

In the navigation system disclosed in the aforementioned Japanese Patent Application Publication No. JP-A-2006-146645, because the subject information can be decided so as not to collect similar driving data from a plurality of navigation devices, duplicate data collection can be avoided. Also, specifying the subject information to collect to the subject information in great need, makes it possible to lower the frequency of data collection and to suppress the communication cost entailed.

SUMMARY

However, according to the above navigation systems, a communication cost can become high, because unnecessary data is also transmitted to the information center as the navigation device transmits the all of the driving data for the subject information. Due to the high communication cost a processing load in the information center also becomes high.

Various exemplary implementations of the broad principles described herein provide systems and methods that may reduce unnecessary information transmitted from a navigation device to an information center in order to reduce the communication cost entailed as well as to reduce the processing load of the information center.

Various exemplary implementations provide an information center that may store limiting information for specifying a content of probe information in accordance with predefined factors, may specify a predefined factor corresponding to a navigation device, may select the limiting information based on the specified predefined factor, may transmit the selected limiting information to the navigation device, and may receive the corresponding probe information transmitted from a navigation device.

Various exemplary implementations provide a navigation device that may be installed in a probe car. The navigation device may receive limiting information from an information center, may collect probe information, may select only the probe information specified by the received limiting information for transmission to the information center, and may transmit the selected probe information to the information center.

BRIEF DESCRIPTION OF THE DRAWINGS

Exemplary implementations will now be described with reference to the accompanying drawings, wherein:

FIG. 3 is a chart illustrating an exemplary data configuration of collecting pattern data;

FIG. 4 is a chart showing one example of pattern information;

DETAILED DESCRIPTION OF EMBODIMENTS

Figure 1:
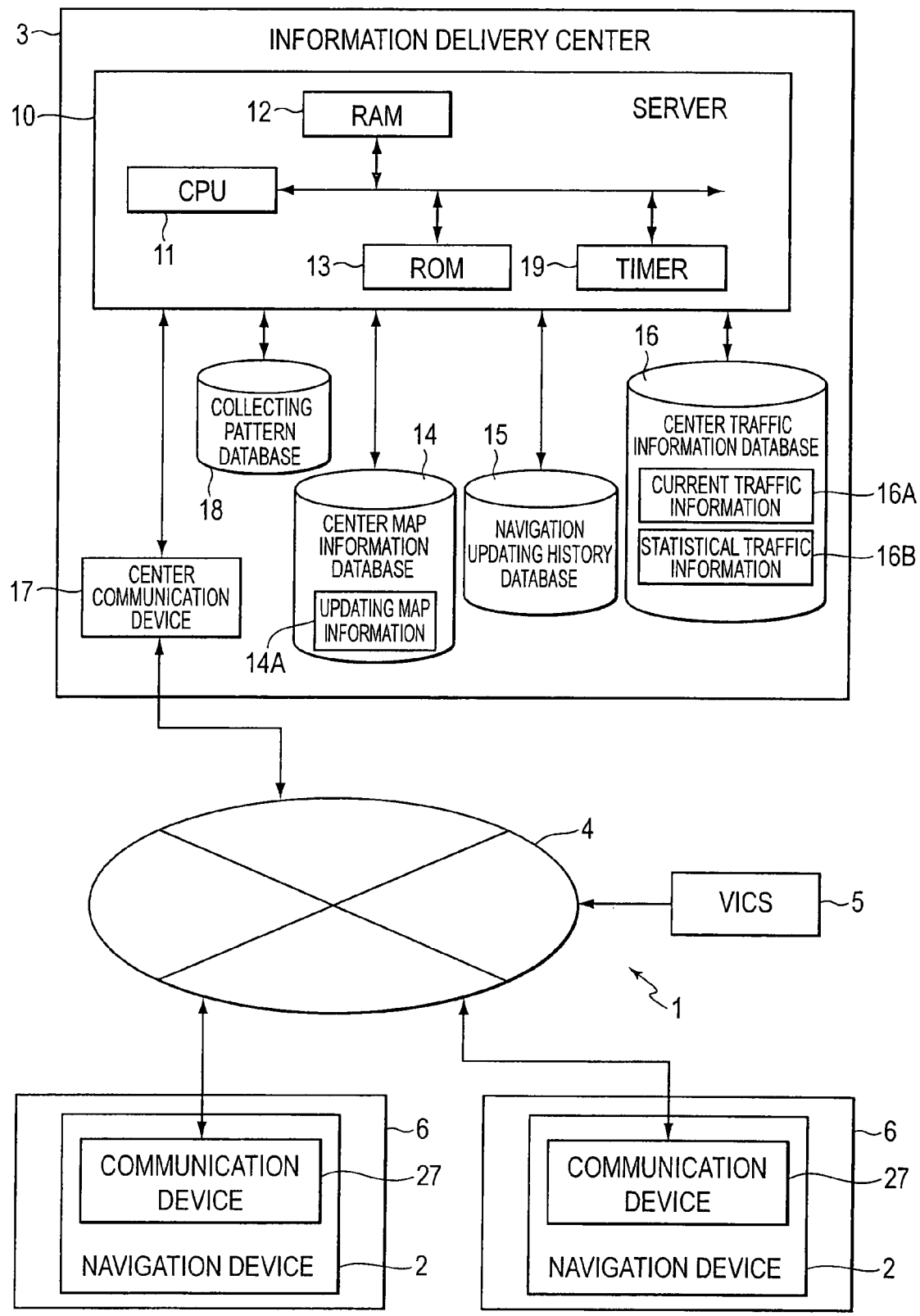
FIG. 1 is a block diagram of an exemplary navigation system.

An outline configuration of an exemplary navigation system 1 is described with reference to FIG. 1. FIG. 1 shows a block diagram of the navigation system 1 of the first embodiment.

As indicated in FIG. 1, the navigation system 1 may be configured with a navigation device 2 installed on each probe car 6, an information delivery center 3 as an information center that delivers information for updating map information and traffic information to the navigation device 2, and a network 4. The information for updating map information and traffic information may include traffic congestion information made based on probe information that is collected from each of the navigation devices 2. The navigation device 2 and the information delivery center 3 may be configured to send and receive various types of information via the network 4.

The network 4 may be connected with a vehicle information and communication system 5 (e.g., a VICS® center) via the network 4. The navigation device 2 and the information delivery center 3 may be configured to receive, in a predefined time interval, information relating to road traffic congestion and traffic information such as traffic control information made by collecting the information of traffic control system managed by the police, Japan Highway Public Corporation, and the like. The traffic information may be detailed information of road traffic information such as road congestion information relating to road congestions and traffic control information due to road constructions, building constructions and such.

Such detailed information for the road congestion information may include, a VICS link ID, an actual length of traffic congestion, a time required to pass through the congestion, a degree of congestion (e.g., distinction of light/heavy/congested), a driving speed in congestion, a traveling time, a traveling direction of congested car lanes, and/or time anticipated to clear up congestion. Such detailed information for the traffic control information may include the VICS link ID, a duration of road construction and building construction, types of traffic control (e.g., road block, two way alternate lane, and closed lanes), and/or time periods of the applied traffic control.

The information delivery center 3, as indicated in FIG. 1, may functionally, physically, and/or conceptually include a server 10, a center map information database 14 connected to the server 10, a navigation updating history database 15, a center traffic information database 16, a center communication device 17, and/or a collecting pattern database 18. The server 10 may include a CPU 11 as an arithmetic device and a controller to control the server 10, a RAM 12 used as a working memory when the CPU 11 executes various arithmetic processes, an internal memory device such as a ROM 13 storing various control programs to run processes, and a timer 19 to measure the time. The CPU 11 may be substituted by an MPU and such.

Such processes that may be stored and executed include, for example, a map information updating process of extracting updating information for updating map information of a predefined area within the map information stored in the navigation device 2 to that of a new version from the center map information database 14 based on the request from the navigation device 2 and delivering it to the navigation device 2, a collecting pattern transmitting process (refer to FIG. 5) of selecting a collecting pattern which indicates a data content of probe information to be transmitted to the information delivery center 3 and transmitting the selected collecting pattern to the navigation device 2 installed on the probe car 6, and a traffic information delivery process of delivering the current traffic information to the navigation device 2 via the network 4 according to the request from the navigation device 2.

The center map information database 14 may store updating map information 14A, sorted by version, that is created by the information delivery center 3 and which may then be used to update map information stored in the navigation device 2. Further, the center map information database 14 may store updating information for updating a part or the whole of the map information currently stored in the navigation device 2 to the updating map information 14A. Here, a version means creation time information to specify when the map information is created, and referring to the version makes it possible to identify the time when the map information is created.

The updating map information 14A stored in the center map information database 14 stores various types of information required for route guidance and map display of the navigation device 2 including, for example, map display data to display maps, intersection data relating to intersections, node data relating to node points, link data relating to roads (road links) as one of facilities, search data to search routes, shop data relating to point of interest (POI) such as a shop as one of facilities, and spot search data to search spots.

As used herein, the term "link" refers to, for example, a road or portion of a road. For example, according to one type of road data, each road may consist of a plurality of componential units called links. Each link may be separated and defined by, for example, an intersection, an intersection having more than three roads, a curve, and/or a point at which the road type changes. As used herein the term "node" refers to a point connecting two links. A node may be, for example, an intersection, an intersection having more than three roads, a curve, and/or a point at which the road type changes.

The map display data may be configured, for example, by units of 4 divided blocks (½ length), 16 divided blocks (¼ length) and 64 divided blocks (⅛ length) based on a 10 km×10 km block of a secondary mesh, and the unit of each geographical area may be set so as to have approximately the same amount of data. The smallest unit of 64 divided blocks may be a size of an approximately 1.25 km square.

As for node data, the data stored may include the data relating to forks in actual roads (including intersections and T-shaped intersections), coordinates (positions) of node points that are set to each road at predefined intervals according to a curvature radius and such, node attributes representing whether a node corresponds to an intersection or not, a connection link number list which is a list of link ID numbers of connecting links to nodes, an adjacent node number list which is a list of node numbers of adjacent nodes via links, and heights (altitudes) of each node point.

As for link data, the data stored may include the data relating to road (hereinafter called links) configuration, such as widths, gradients, cants, banks, surface conditions, number of lanes, places where any lane ends, places where any road narrows, and railroad crossing of the roads to which links attribute. The data stored may include data relating to corners representing such as curvature radii, intersections, T-shaped intersections, and entrance and exit of corners. The data stored may include data relating to road attributes representing such as uphills and downhills. The data stored may include data relating to road categories representing ordinary roads including national roads, principal prefectural roads, prefectural roads, and municipal roads, narrow streets which are narrower than ordinary roads in town, and toll roads including national expressways, city expressways, ordinary toll roads, and toll bridges. Further, as for toll roads, the data stored may include access roads of entrance and exit of toll roads (ramps), and tollgates (interchanges).

As for search data, the data stored may be used when searching and displaying routes to the set destination. The data may include cost data used to calculate an opportunity cost (hereinafter "cost") of each node determined by right/left turns and distance, width, road category and such of links which configure roads when passing nodes, and route display data to display the route selected by route searching superimposed on a map displayed on a liquid crystal display 25.

As for shop data, the data stored may include the data relating to POI such as hotels, hospitals, gas stations, parking lots and tourist facilities for each region together with their IDs to identify the POI. The center map information database 14 may also store audio output data to output a predefined data from a speaker 26 in the navigation device 2.

The information delivery center 3, when requested by the navigation device 2, may update the map information stored in the navigation device 2 with the latest version of updating map information 14A stored in the center map information database 14. Specifically, in the navigation system 1, when a delivery of updating map information 14A is requested by the navigation device 2, the update may be executed by delivering updating information for updating to the latest version of the updating map information 14A to the navigation device 2. The updating information transmitted to the navigation device 2 may be configured to send the whole information including newly constructed road information (which, for example, specifies newly constructed roads in the latest version of updating map information 14A), or the bare minimum amount of information for updating from the map information currently stored in the navigation device 2 to the latest version of updating map information 14A (for example, the updating part of the information only, including the newly constructed road information which specifies newly constructed roads).

The navigation updating history database 15 may store information relating to an updating history of map information stored in the navigation device 2 updated to date together with its navigation ID, which identifies the navigation device 2. As for the updating history, the version of map information used for each piece of link data and node data (which specifically configures the map information) is stored, and the updating history is renewed every time the map information in the navigation device 2 is updated.

The center traffic information database 16 may store current traffic information 16A which is the information relating to the status of current road congestions and such made from the probe information and the traffic information received from the vehicle information and the vehicle information and communication system center 5. The probe information may include, for example, month, date, time, link information (such as mesh ID, link ID, link length, presence of traffic signals, and road category), traffic conditions (such as traveling time, degree of congestion, and driving speed), vehicle position, secondary mesh ID of vehicle position, operating status of the windshield wiper, outside/road-surface temperatures, weather, operating status of the antilock brake system (ABS), road surface conditions, and/or vehicle information (such as the type, various performance data, speed, seating capacity, weight distribution rate, and torque delivery of the vehicle). Such probe information may be collected by the navigation device 2 installed on the probe car 6.

The center traffic information database 16 may also store statistical traffic information 16B, which is the statistical traffic information relating to the status of road congestion and such made in the past. The statistical traffic information 16B may include the information of time, date and place of planned events such as festivals, parades, fireworks exhibitions; statistical congestion information indicating that, for example, the surrounding roads of stations and large commercial facilities get congested at certain time everyday except weekends, and access roads to swimming beaches get congested in summer holiday season; and congestion forecast information.

The information delivery center 3, when requested from the navigation device 2, may select and deliver traffic information and such based on the current traffic information 16A and the statistical traffic information 16B stored in the center traffic information database 16.

The traffic information received from the vehicle information and communication system center 5 may include VICS link IDs together with the information such as road category information, location, distance of congested sections, and degree of congestion. Each VICS link ID is an identification number given to a VICS link as a travel guidance link, which is standardized by dividing roads by, predefined intersections. The aforementioned traffic information includes coordinates of the start and end points and the distance between the start and end points for each VICS link.

The road links stored in the center map information database 14 and the VICS links may not be the same (generally, the road links are divided more finely than VICS links). Therefore, a conversion table may be provided, so that a corresponding road link ID can be specified according to a VICS link ID. Consequently, the traffic information may be transmitted by converting the VICS link ID to the road link ID that is used in the navigation device 2.

The information delivery center 3, when selecting a collecting pattern that indicates the data content of probe information transmitted to the information delivery center 3 for the navigation device 2, decides the collecting pattern based on collecting pattern data 51 stored in the collecting pattern database 18. The collecting pattern data 51 is described here with reference to FIG. 3. FIG. 3 is a chart illustrating an exemplary data configuration of the collecting pattern data 51 that may be stored in the collecting pattern database 18.

As indicated in FIG. 3, the collecting pattern data 51 may be configured with a period 51A which is a duration of collecting probe information; a general area 51B (i.e., an unspecified area); a specific area 51C; and a collecting pattern 51D as limiting information of a collecting pattern which instructs the navigation device 2 in each area of 51B and 51C.

The period 51A divides the collecting pattern 51D for periods such as "Oct. 1, 2006 to Oct. 31, 2006"; "Nov. 1, 2006 to Nov. 30, 2006"; and "Dec. 1, 2006 to Dec. 31, 2006."

The subdata of the period 51A are the general area 51B and the specific area 51C. The general area 51B and specific area 51C specify the collecting pattern 51D for each area. The specific area 51C divides the collecting pattern 51D for areas such as the "Tokyo area" which represents Tokyo; the "Aichi area" which represents Aichi prefecture; and the "Hokkaido area" which represents Hokkaido.

For example, the period 51A of "Oct. 1, 2006 to Oct. 31, 2006" and the general area 51B select "pattern 1" as the collecting pattern 51D. The period 51A of "Oct. 1, 2006 to Oct. 31, 2006" and the specific area 51C of the "Tokyo area" select "pattern 2" for the first to one-hundredth probe cars 6 and "pattern 8" for the one-hundred-first or higher probe cars 6. The period 51A of "Nov. 1, 2006 to Nov. 30, 2006" and the general area 51B select "pattern 4" as the collecting pattern 51D. The period 51A of "Nov. 1, 2006 to Nov. 30, 2006" and the specific area 51C of the "Hokkaido area" select "pattern 7" as the collecting pattern 51D.

Therefore, the collecting pattern 51D is the data given with predefined factors of the period 51A (seasonal factor) and areas 51B and 51C (regional factor).

The collecting pattern database 18 stores a transmission data table 61 that specifies the data content of probe information transmitted corresponding to collecting patterns specified by the collecting pattern 51D. The information delivery center 3 delivers the transmission data table 61, in a predefined interval (for example, every 3 to 6 months), to the navigation devices 2 installed on the probe cars 6. The navigation device 2 then stores the transmission data table 61 in a transmitting pattern database 39 (refer to FIG. 2) thereby updating any previously stored transmission data table 61 in the transmitting pattern database 39.

The transmission data table 61 is described here with reference to FIG. 4. FIG. 4 is a chart showing one example of the transmission data table 61 that may be stored in the collecting pattern database 18. As indicated in FIG. 4, the transmission data table 61 may be configured with collecting patterns each of which represents the collecting pattern 51D and the content of transmission data corresponding to the collecting patterns.

The content of transmission data specifies the data to be transmitted such as a data category, collecting time and date, and collecting day.

For example, with the collecting pattern of "pattern 1," the corresponding content of transmission data may include all data of the probe information (described above) collected by the navigation device 2, except for the operating status of the antilock brake system (ABS) and outside/road-surface temperatures. With the collecting pattern of "pattern 2," the corresponding content of transmission data may include only the congestion information (i.e., traveling time, degree of congestion, and driving speed for links) out of the probe information colleted by the navigation device 2. With the collecting pattern of "pattern 3," the corresponding content of transmission data includes all data of the probe information collected by the navigation device 2 on Saturdays, Sundays and holidays within the period 51A, except for the operating status of the antilock brake system (ABS). With the collecting pattern of "pattern 5," the corresponding content of transmission data includes all data except for degree of congestion and operating status of ABS out of the probe information collected by the navigation device 2. With the collecting pattern of "pattern 8," the corresponding content of transmission data directs to stop transmitting all data of the probe information of the day.

The information delivery center 3 may be run by any individuals, business companies, organizations, local governments, and government affiliated organizations as well as vehicle information and communication system centers 5.

At for the network 4, a communication system of telecommunication networks such as a local area network (LAN), a wide area network (WAN), an intranet, a mobile telephone (cellular) network, a telephone line network, a public telecommunication network, a private communication network, and the Internet may be used. Such communication systems that use communication satellite (CS) broadcasting and broadcast satellite (BS) broadcasting by broadcast satellites, terrestrial digital television broadcasting, and FM multiplex broadcasting may be used as well. Further, such communication systems as non-stop electronic toll collection system (ETC) and dedicated short-range communication system (DSRC) used in intelligent transportation systems (ITS) may be used.

Figure 2:
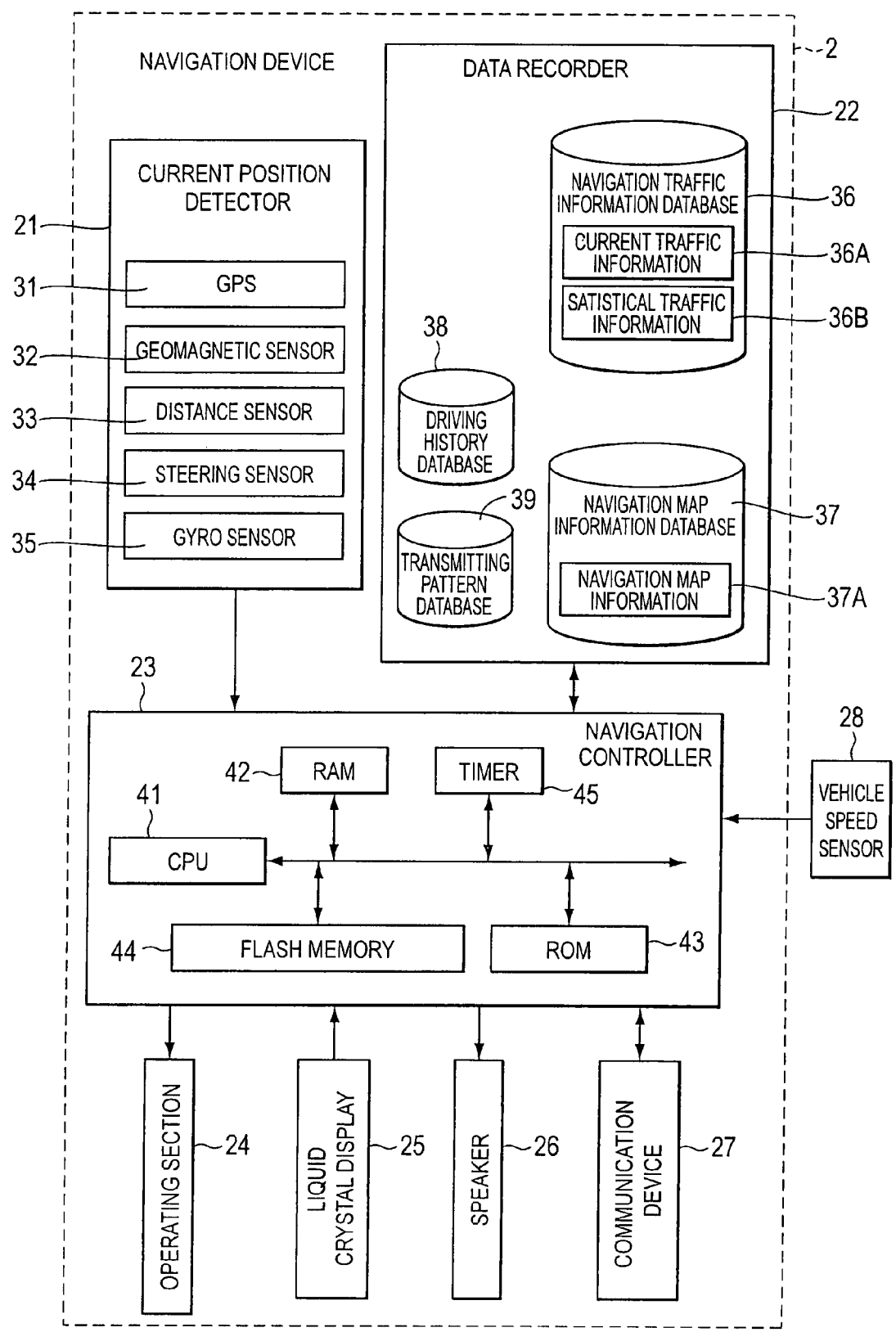
FIG. 2 is a block diagram of an exemplary navigation device in the navigation system.

Next, an exemplary configuration of the navigation device 2 is described with reference to FIG. 2. As shown in FIG. 2, the navigation device 2 may include a current position detector 21 that detects the current position of a vehicle, a data recorder 22 in which various types of data are recorded, a navigation controller 23 that performs various arithmetic processes according to the data entered, an operating section 24 that accepts operations made by an operator, a liquid crystal display 25 that displays information such as a map for the operator, a speaker 26 that outputs audio guidance relating to route guidance, and a communication device 27 that allows communication with the vehicle information and communication system 5 and the information delivery center 3 via, for example, a mobile telephone network. The navigation controller 23 may be coupled with a vehicle speed sensor 28, which detects the driving speed of the vehicle.

The current position detector 21 may include a GPS 31, a geomagnetic sensor 32, a distance sensor 33, a steering sensor 34, a gyro sensor 35 as a direction detector, and/or an altimeter (not shown), and may detect the current position, direction of the vehicle, a distance to a landmark (an intersection, for example) and such.

Specifically, the GPS 31 may detect the current position of the vehicle on the road and the current time by receiving radio waves emitted from satellites. The geomagnetic sensor 32 may detect a direction of the vehicle by measuring the earth's geomagnetic field. The distance sensor 33 may detect the distance between predefined points on a road, for example. As for the distance sensor 33, for example, a sensor which measures a rotation speed of the wheels (not shown) and detects a distance based on the rotation speed measured, and a sensor which measures acceleration speed and double integrates the acceleration speed measured to obtain a distance may be used.

The steering sensor 34 may detect a steering angle of the vehicle. As for the steering sensor 34, for example, an optical rotation sensor and a rotational resister sensor attached to a rotating section of the steering wheel (not shown), and an angle sensor attached to a wheel may be used.

The gyro sensor 35 may detect an angle of traverse. As for the gyro sensor 35, for example, a gas rate gyroscope and a vibrating gyroscope may be used. The direction of the vehicle can be detected by integrating the angle of traverse detected by the gyro sensor 35.

The data recorder 22 may have a hard disk (not shown) as an external storage device and a storage medium, a navigation traffic information database 36, a navigation map information database 37, a driving history database 38 and a transmitting pattern database 39 stored in the hard disk, and a recording head (not shown) as a driver to write predefined data to the hard disk as well as to read out predefined programs and such. While the hard disk may be used as an external storage device and a storage medium of the data recorder 22, magnetic disks such as a flexible disk may additionally or alternatively be used as an external storage device. A memory card, a magnetic tape, a magnetic drum, a CD, an MD, a DVD, an optical disc, an MO, an IC card, an optical card and the like may additionally or alternatively be used as an external storage device as well.

The navigation traffic information database 36 may store current traffic information 36A based on the traffic information received from the information delivery center 3 and the vehicle information and communication system 5. The current traffic information may include road congestion information relating to the current road congestion that includes an actual length of congestion, a cause of congestion, and an estimated clearing up time of congestion, and traffic control information relating to constructions of road, building and such. The navigation traffic information database 36 may also store statistical traffic information 36B that is statistical traffic information relating to road congestions made in the past. The statistical traffic information 36B may include the information of time, date and place of planned events such as festivals, parades, fireworks exhibitions; statistical congestion information in that, for example, the surrounding roads of stations and large commercial facilities get congested at certain time everyday except weekends, and access roads to swimming beaches get congested in summer holiday season; and congestion forecast information.

The navigation map information database 37 may store navigation map information 37A that is used for route guidance and route searching of the navigation device 2 and the subject to update by the information delivery center 3 as well. The navigation map information 37A may include, similar to the updating map information 14A, various types of data required for route guidance and map display, for example, newly constructed road information to identify newly constructed roads, map display data to display maps, intersection data relating to intersections, node data relating to node points, link data relating to road links as one of facilities, search data to search routes, shop data relating to POI such as a shop as one of facilities, and spot search data to search spots. As the details of various types of data have been described already, their details are omitted here. The content of the navigation map information database 37 may be updated by downloading updating information delivered from the information delivery center 3 via the communication device 27.

The driving history database 38 may store in sequence, for each link driven, probe information (discussed above). The transmitting pattern database 39 may store the abovementioned transmission data table 61 received from the information delivery center 3. The navigation device 2 installed on the probe car 6, while the probe car 6 is driven, may read out the content of transmission data corresponding to the collecting pattern 51D indicated by the information delivery center 3 from the transmitting table 61. Thus, the navigation device 2 may collect probe information according to the content of transmission data, and then transmits the information to the information delivery center 3 via the communication device 27 when the time comes to transmit (refer to FIG. 6).

As indicated in FIG. 2, the navigation controller 23 included in the navigation device 2 may have a CPU 41 as an arithmetic device and a controller to control the whole navigation device 2, a RAM 42 used as a working memory when the CPU 41 executes various arithmetic processes as well as to store such information as route data when a route is searched and traffic information received from the information delivery center 3. The navigation controller 23 may include a ROM 43 that stores programs and such, in addition to control programs, including a probe information transmitting process program which obtains probe information and transmits the probe information to the information delivery center 3 in a predefined interval. The navigation controller 23 may include an internal storage device such as a flash memory 44 to store the programs read out from the ROM 43, and a timer 45 to measure time. As for the RAM 42, ROM 43 and flash memory 44, a semiconductor memory and a magnetic core may be used, for example. As for the arithmetic device and controller, an MPU and the like may be used in place of the CPU 41.

While various programs may be stored in the ROM 43 and various types of data may be stored in the data recorder 22, programs and data may be read out from the same external storage device, memory card and such and stored to the flash memory 44. Further, the programs and data can be updated by replacing the memory card and such.

The navigation controller 23 may be connected to peripheral devices (actuators) of the operating section 24, the liquid crystal display 25, the speaker 26, and the communication device 27.

The operating section 24 may be used, for example, for correcting the current position at the start of drive, for entering a start point as a guidance start point and a destination as a guidance end point, and for searching data relating to facilities. The operating section 24 may have various keys and a plurality of operating switches. The navigation controller 23 may perform various corresponding operations according to switch signals output by pressing and such of the switches. As for the operating section 24, for example, a keyboard, a mouse, a barcode reader, a remote controller for remote operation, a joystick, a light pen, and a stylus pen may be used. The operating section 24 may be configured with a touch panel attached to the front surface of the liquid crystal display 25.

The liquid crystal display 25 may display, besides a route guidance screen which shows a map based on the navigation map information 37A and traffic information for links, operation guidance, operation menu, guidance of keys, guidance route from the current position to the destination, guidance information along the guidance route, traffic information, news, weather forecast, time, mail, television programs and such. In place of the liquid crystal display 25, a CRT display, a plasma display and such may be used, and a hologram device which projects a hologram to the front window of the vehicle may be used as well.

The speaker 26 may output voice guidance of driving along the guidance route according to instructions from the navigation controller 23. As for the voice guidance, for example, "200 meters ahead, right direction at XYZ intersection" and "national road number N ahead is congested" may be given. The sound output from the speaker 26 may also include various sound effects and various guidance information prerecorded onto tapes and memories, besides synthesized voice.

The communication device 27 allows communication with the information delivery center 3 via a mobile telephone network and such, and sends and receives the latest version of updating map information, current traffic information and such with the information delivery center 3. In addition to such transactions with the information delivery center 3, the communication device 27 may receive traffic information including traffic congestion information, traffic control information, parking lot information, traffic accident information, and information on congestion of service areas and such transmitted from, for example, the vehicle information and communication system 5.

Figure 5:
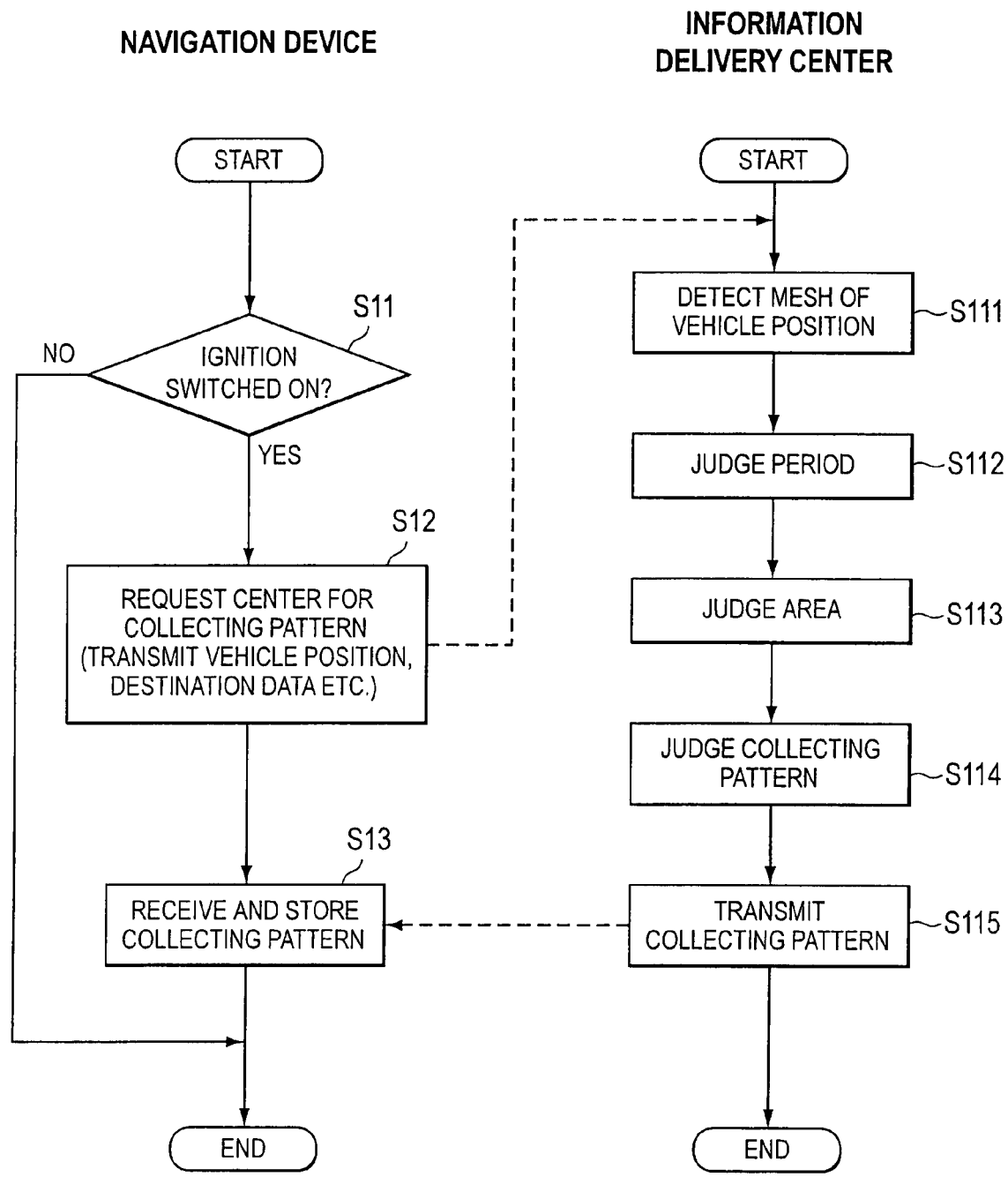
FIG. 5 is a flowchart showing an exemplary method for collecting and delivering a collecting pattern.

FIG. 5 shows an exemplary method for collecting and delivering a collecting pattern. The exemplary method may be implemented, for example, by one or more components of the above-described system 1. However, even though the exemplary structure of the above-described system 1 may be referenced in the description, it should be appreciated that the structure is exemplary and the exemplary method need not be limited by any of the above-described exemplary structure. For example, parts of the method may be implemented as a computer program (S11 to S13) stored in the RAM 42 and ROM 43 in the navigation device 2 and executed by the CPU 41. Other parts of the method may be implemented as a computer program (S111 to S115) stored in the RAM 12 and ROM 13 in the information delivery center 3 and executed by the CPU 11.

As shown in FIG. 5, in step (hereinafter abbreviated "S") 11, the CPU 41 first judges whether the ignition switch is turned on based on, for example, a detecting signal sent from an electronic control unit (ECU) of a vehicle (not shown), Specifically, whether the engine of the vehicle is running or not. When the ignition switch is off (S11: NO), the navigation portion of the method ends.

When the ignition switch is on (S11: YES), the CPU 41 moves on to the process in S12. In S12, the CPU 41 transmits, to the information delivery center 3, a request command for requesting a collecting pattern 51D together with the information such as, for example, current vehicle position data and destination coordinate data.

Then, in S13, the CPU 41 receives the collecting pattern 51D from the information delivery center 3, stores the collecting pattern 51D to the RAM 42. After S13, the navigation device portion of the method ends.

Next, the collecting pattern delivery portion of the method, which may be executed by the CPU 11 in the information delivery center 3 is described.

In S11, the CPU 11 first receives the request command for requesting the collecting pattern 51D together with the information such as, for example, vehicle position data and destination coordinate data transmitted from the navigation device 2 in S12 above, and stores the information to the RAM 12. The CPU 11, in S11, detects and stores a mesh ID of a secondary mesh of the vehicle position to the RAM 12 based on the vehicle position data received and map display data stored in the updating map information 14A.

In S112, the CPU 11 reads, for example, time data and such from the timer 19 to obtain the current time and date, specifies the current period 51A in the collecting pattern data 51 stored in the collecting pattern database 18 and stores the period 51A to the RAM 12. For example, when the current time and date is at 7:15 on Oct. 2, 2006, the CPU 11 specifies the period 51A of "Oct. 1, 2006 to Oct. 31, 2006."

In S113, the CPU 11 reads out the mesh ID of the secondary mesh where the navigation device 2 is located from the RAM 12, judges to which area the navigation device 2 belongs between the general area 51B and the specific area 51C in the collecting pattern data 51 corresponding to the period 51A specified in S112 above, and stores the area to the RAM 12. For example, as indicated in FIG. 3, when the period 51A is "Oct. 1, 2006 to Oct. 31, 2006," and the mesh ID of the secondary mesh of the vehicle position received from the navigation device 2 is within Gifu prefecture, the CPU 11 judges that the navigation device 2 is located in the general area 51B (i.e., not in any of the specific areas 51C). When the period 51A is "Oct. 1, 2006 to Oct. 31, 2006," and the secondary mesh of the vehicle position received from the navigation device 2 is within Aichi prefecture, the CPU 11 judges that the navigation device 2 is located in the "Aichi area" in the specific area 51C.

In S114, the CPU 11 reads out the collecting pattern 51D corresponding to the period 51A specified in S112 above and the general area 51B or the specific area 51C specified in S113 above from the collecting pattern data 51, and stores the collecting pattern 51D to the RAM 12.

For example, as indicated in FIG. 3, when the period 51A is "Oct. 1, 2006 to Oct. 31, 2006," and the vehicle position is in the general area 51B, the CPU 11 reads out the collecting pattern 51D of "pattern 1" from the collecting pattern data 51 and stores the "pattern 1" in the RAM 12.

When the period 51A is "Oct. 1, 2006 to Oct. 31, 2006," and the vehicle position is in the "Tokyo area" in the specific area 51C, and the vehicle that requested the collecting pattern 51D to the information delivery center 3 is the first to one-hundredth car, the CPU 11, for example, reads out the collecting pattern 51D of "pattern 2" from the collecting pattern data 51 and stores the "pattern 2" to the RAM 12. Meanwhile, when the period 51A is "Oct. 1, 2006 to Oct. 31, 2006," and the vehicle position is in the "Tokyo area" in the specific area 51C, and the vehicle that requested the collecting pattern 51D to the information delivery center 3 is the one-hundred-first or higher car, the CPU 11, for example, reads out the collecting pattern 51D of "pattern 8" from the collecting pattern data 51 and stores the "pattern 8" to the RAM 12.

In S115, the CPU 11 transmits the collecting pattern 51D read out from the collecting pattern data 51 in S114 above to the navigation device 2 which transmitted the request command for requesting the collecting pattern 51D, and finishes the method.

For example, when the collecting pattern 51D read out from the collecting pattern data 51 is "pattern 8" in S114 above, the CPU 11 transmits the "pattern 8" as the collecting pattern 51D to the navigation device 2 which transmitted the request command for requesting the collecting pattern 51D, and finishes the relevant process.

An exemplary method of collecting and transmitting probe information based on a received collecting pattern is described next with reference to FIG. 6. Again, the exemplary method may be implemented, for example, by one or more components of the above-described system 1. However, even though the exemplary structure of the above-described system 1 may be referenced in the description, it should be appreciated that the structure is exemplary and the exemplary method need not be limited by any of the above-described exemplary structure. For example, the method may be executed by the CPU 41 in the navigation device 2 to collect probe information based on the collecting pattern 51D received and to transmit the probe information to the information delivery center 3.

Figure 6:
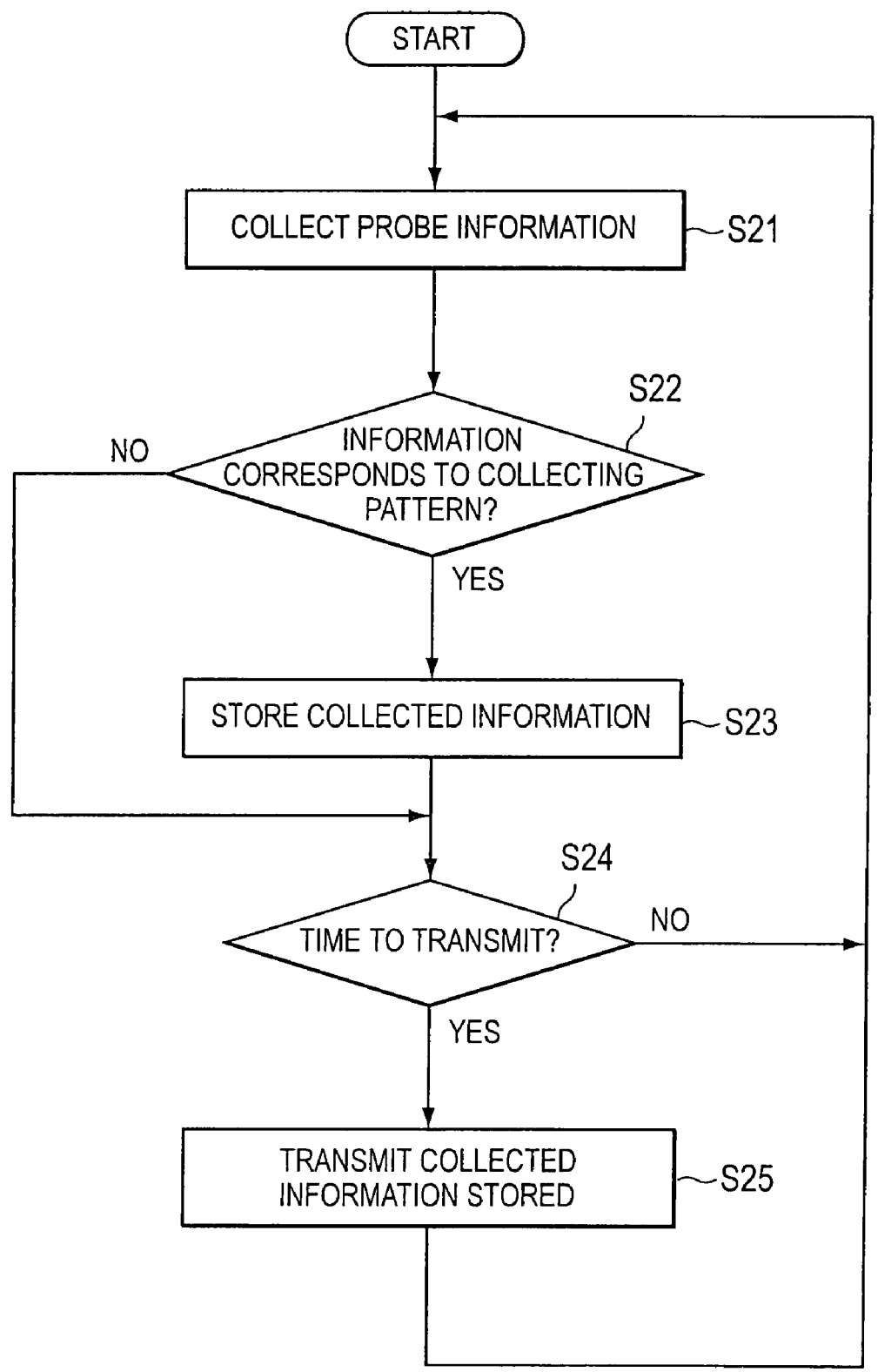
FIG. 6 is a flowchart showing an exemplary method for collecting and transmitting probe information.

As shown in FIG. 6, in S21, the CPU 41 first collects all probe information and stores the probe information (discussed above) to the RAM 42 temporarily. For example, the CPU 41 collects the operating status of the windshield wiper in a predefined interval (for example, every 1 to 3 minutes) as probe information and stores the information to the RAM 42 temporarily. The CPU 41 may collect, for example, when the antilock brake system (ABS) is activated, as the operating status of the ABS as probe information and stores the information to the RAM 42 temporarily.

In S22, the CPU 41 judges whether each piece of probe information temporarily stored in the RAM 42 is relevant to the content of transmission data corresponding to the collecting pattern 51D received from the information delivery center 3. Specifically, the CPU 41 reads out the content of transmission data, corresponding to the collecting pattern 51D received, from the transmission data table 61 (refer to FIG. 4) stored in the transmitting pattern database 39 and judges whether each piece of probe information temporarily stored in the RAM 42 is relevant to the content of transmission data.

When the probe information relevant to the content of transmission data is present in the collected probe information (S22: YES), the CPU 41 stores the probe information relevant to the content of transmission data in the driving history database 38, and afterwards erases the probe information from the RAM 42 (S23).

Meanwhile, when certain probe information collected is not relevant to the content of transmission data (S22: NO), the CPU 41 erases the irrelevant probe information from the RAM 42, without storing it in the driving history database 38.

One example of probe information which the CPU 41 may store in the driving history database 38 when "pattern 5" of the collecting pattern 51D is received from the information delivery center 3 is described with reference to FIGS. 4 and 7.

Figure 7:
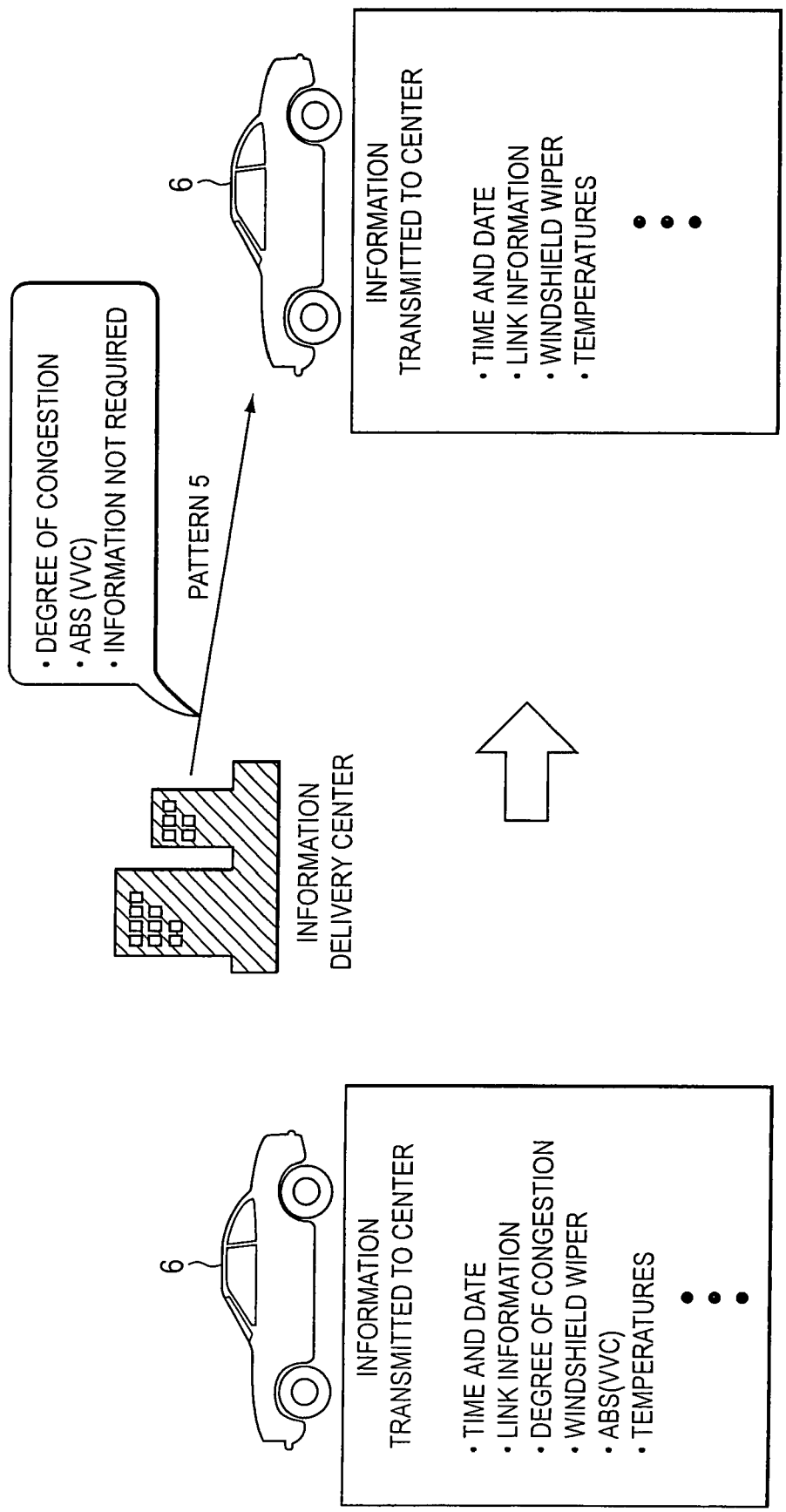
FIG. 7 is an illustration showing an example of probe information stored in a driving history database.

As indicated in FIG. 7, the CPU 41 in the navigation device 2 installed on the probe car 6, when receiving "pattern 5" of the collecting pattern 51D from the information delivery center 3, reads out "all data except for degree of congestion and operating status of the ABS." The CPU 41 thus, for example, stores all data except for the degree of congestion and operating status of the ABS from the probe information. As a result, for example, date, time, link information, degree of congestion, operating status of the windshield wiper, operating status of the ABS, outside/road-surface temperatures, which has been temporarily stored in the RAM 42, is stored in the driving history database 38. Afterwards the probe information is erased from the RAM 42.

In S24, the CPU 41 judges whether the time has come to transmit the probe information to the information deliver center 3. For example, the CPU 41 judges whether a predefined time (for example, 5 minutes, 15 minutes, or 30 minutes) has passed since the probe information was last transmitted to the information delivery center 3. Instead, the CPU 41 may judge whether a predefined distance (for example, 1 km, 2 km, or 3 km) has been driven since the probe information was last transmitted to the information delivery center 3. Otherwise, the CPU 41 may judge whether a predefined data amount (for example, 1 MB, 5 MB, or 10 MB) of probe information has been accumulated in the driving history database 38 since the probe information was last transmitted to the information delivery center 3.

When the CPU 41 judges that the time has come to transmit the probe information to the information delivery center 3 (S24: YES), the CPU 41 transmits the probe information newly stored in the driving history database 38 since the probe information was last transmitted to the information delivery center 3. The method then loops back to S21.

Meanwhile, when the CPU 41 judges that the time has not come to transmit the probe information to the information delivery center 3 (S24: NO), the CPU 41 loops back to S21.

One example of the specific probe information transmitting process which is executed by the CPU 41 when "pattern 8" of the collecting pattern 51D is received from the information delivery center 3 is described with reference to FIGS. 4 and 8.

Figure 8:
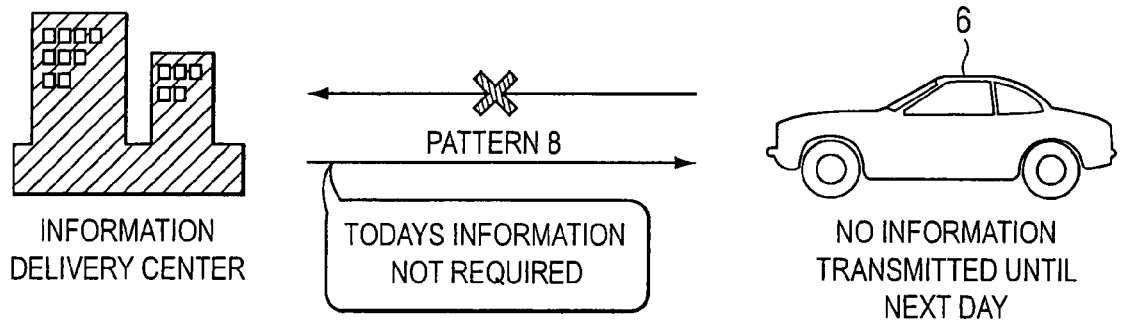
FIG. 8 is an illustration showing an example of a probe information transmitting process.

As indicated in FIG. 8, when receiving "pattern 8" of the collecting pattern 51D from the information delivery center 3, the CPU 41 in the navigation device 2 installed on the probe car 6 reads out the content of transmission data of "stop transmitting all data of the day" from the transmission data table 61 (refer to FIG. 4) stored in the transmitting pattern database 39. The CPU 41, for example, in S22 above, judges not to transmit any probe information to the information delivery center 3 until the next day (S22: NO), and erases the collected probe information from the RAM 42 and then moves on to the process in S24. The CPU 41, when the time comes to transmit (S24: YES), does not transmit any probe information to the information delivery center 3 in S25 as no newly stored probe information is available in the driving history database 38.

Therefore, when no probe information of the day from the relevant probe car 6 is required, the CPU 11 in the information delivery center 3, by transmitting the content of transmission data of "pattern 8" of the collecting pattern 51D to the probe car 6, is able to limit the transmission of unnecessary probe information.

One example of the specific probe information transmitting process which is executed by the CPU 41 of the navigation device 2 when a different collecting pattern 51D for each area is transmitted from the information delivery center 3 to the navigation devices 2 installed on the probe cars 6 located in the Tokyo area and in the Aichi area is described with reference to FIGS. 4 and 9.

Figure 9:
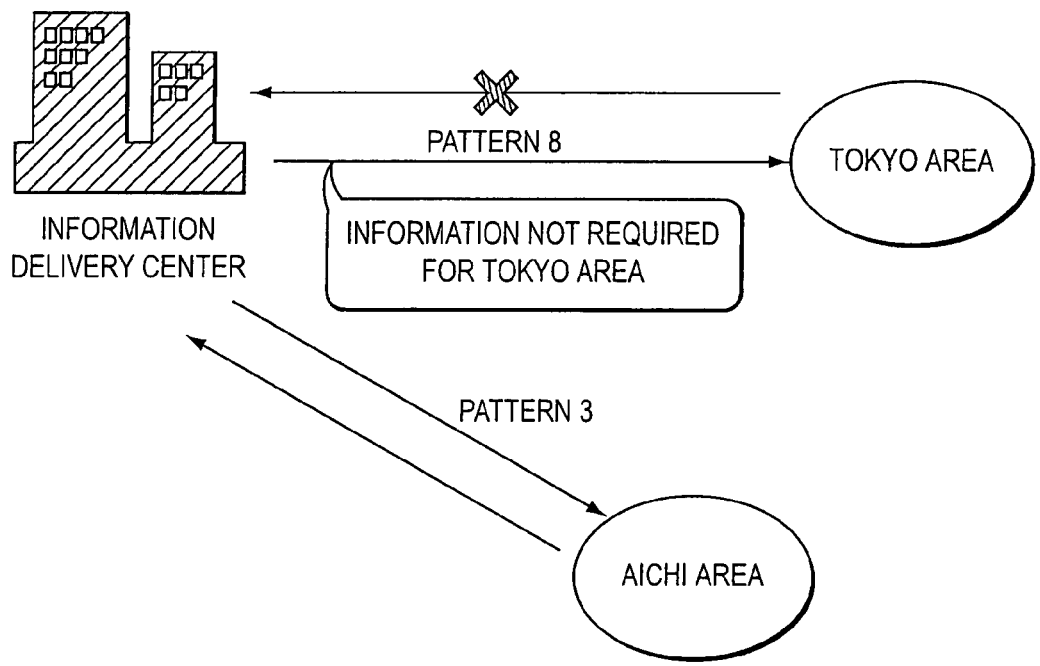
FIG. 9 is an illustration showing an example of a probe information transmitting process.

As indicated in FIG. 9, when receiving the "pattern 8" of the collecting pattern 51D from the information delivery center 3, the CPU 41 in the navigation device 2 installed on the probe car 6 located in the Tokyo area, does not transmit probe information to the information delivery center 3 until the next day. Meanwhile, when receiving "pattern 3" of the collecting pattern 51D from the information delivery center 3, the CPU 41 in the navigation device 2 installed on the probe car 6 located in the Aichi area, reads out "all data except for operating status of ABS on Saturdays, Sundays and holidays" from the transmission data table 61 (refer to FIG. 4) stored in the transmitting pattern database 39.

Thus, for example, the CPU 41 reads out time data from the timer 45; when the day is any one of Saturdays, Sundays or holidays, stores the probe information except for the operating status of the ABS to the driving history database 38 (S21 to S23); and transmits the probe information stored in the driving history database 38 to the information delivery center 3 when the time comes to transmit (S24 to S25). The CPU 41 reads out time data from the timer 45; when the day is not any one of Saturdays, Sundays or holidays, judges not to transmit any probe information to the information delivery center 3 until the next day (S22: NO); erases the collected probe information from the RAM 42; and then moves on to the process in S24. When the time comes to transmit (S24: YES), the CPU 41 does not transmit any probe information to the information delivery center 3 in S25, as no probe information is stored in the driving history database 38. Therefore, the information delivery center 3 is able to collect, from the probe car 6 located in the Aichi area, all data except for the operating status of the ABS on Saturdays, Sundays, and holidays only.

As described above, when receiving a request for the collecting pattern 51D from the probe car's navigation device 2 together with the information such as vehicle position data and destination coordinate data, the CPU 11 (information delivery center) specifies the period 51A (seasonal factor) and areas of 51B and 51C (regional factor) of the collecting pattern data 51; selects the corresponding collecting pattern 51D (limiting information) from the collecting pattern data 51; and transmits the collecting pattern 51D to the navigation device 2 (S111 to S115). Meanwhile, the CPU 41 (navigation device 2) reads out the content of the received collecting pattern 51D (limiting information) from the transmission data table 61 stored in the transmitting pattern database 39, and transmits the corresponding probe information to the information delivery center 3 (S21 to S25).

Therefore, the CPU 41 selects the information required by the information delivery center 3 based on the collecting pattern 51D, for example, selecting congestion information only when the collecting pattern 51D is "pattern 2," out of the collected probe information, and transmits the selected information to the information delivery center 3. Hence, the communication time with the information delivery center 3 via a mobile telephone and such is shortened, and the communication cost is reduced. Meanwhile, in the information delivery center 3, unnecessary information transmitted from the navigation device 2 is reduced, and the processing load of the information delivery center 3 is reduced.

Furthermore, because the CPU 11 in the information delivery center 3 selects the collecting pattern 51D (limiting information) in consideration of the period 51A (seasonal factor) and areas of 51B and 51C (regional factor), and because the content of transmission data in the transmission data table 61 corresponding to each collecting pattern 51D includes types of data to be transmitted (category of data and road type of data), collecting date and time, and collecting day (time factor), the selection of collecting pattern 51D may be made more precisely.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

Figure 10:
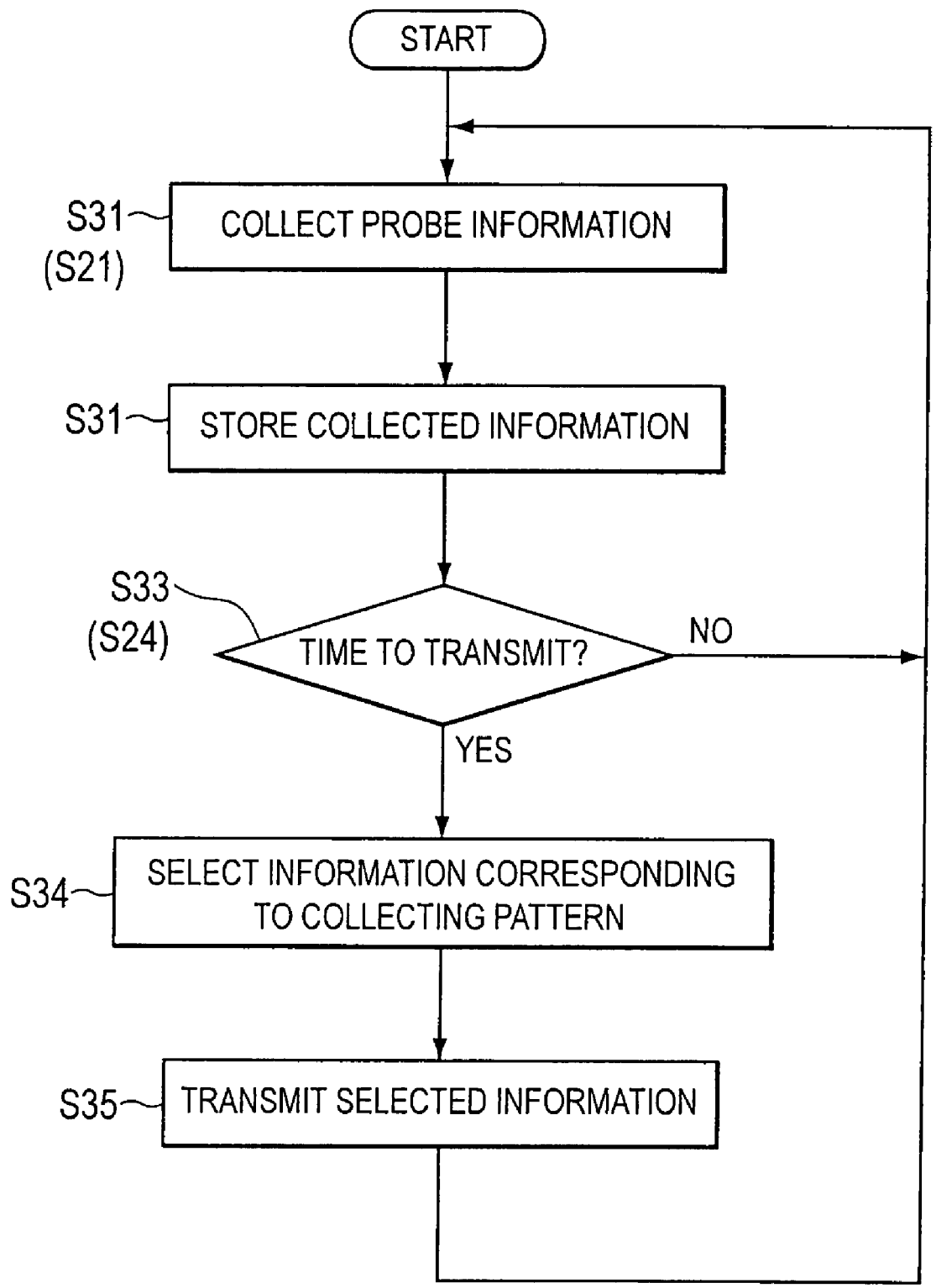
FIG. 10 is a flowchart showing an exemplary probe information transmitting method.

For example, the CPU 41 in the navigation device 2 may execute the probe information transmitting method shown in FIG. 10, instead of the probe information transmitting process indicated in FIG. 6. Again, the exemplary method may be implemented, for example, by one or more components of the above-described system 1. However, even though the exemplary structure of the above-described system 1 may be referenced in the description, it should be appreciated that the structure is exemplary and the exemplary method need not be limited by any of the above-described exemplary structure.

Specifically, as indicated in FIG. 10, the CPU 41 first, in S31, executes the process described in S21 above. In S32, the CPU 41 stores each piece of probe information temporarily stored in the RAM 42 to the driving history database 38 in sequence. In S33, the CPU 41 executes the process in S24 described above. When the CPU 41 judges that the time has not come to transmit the probe information to the information delivery center 3 (S33: NO), the CPU 41 executes the processes in and following S31 again.

Meanwhile, when the CPU 41 judges that the time has come to transmit the probe information to the information delivery center 3 (S33: YES), the CPU 41 moves on to the process in S34. In S34, the CPU 41 reads out the content of transmission data corresponding to the received collecting pattern 51D from the transmission data table 61 (refer to FIG. 4) stored in the transmitting pattern database 39 and stores the content of transmission data to the RAM 42. The CPU 41 selects the probe information relevant to the content of transmission data from each piece of probe information stored in the driving history database 38 after the last transmission, and stores the probe information to the RAM 42.

In S35, the CPU 41 reads out the selected probe information in the RAM 42 in sequence and transmits the probe information to the information delivery center 3, and afterwards loops back to S31 again.

Consequently, the CPU 41 in the navigation device 2 stores all probe information in sequence, and afterwards, when the time comes to transmit, selects the probe information relevant to the content of transmission data corresponding to the received collecting pattern 51D from each piece of probe information stored in the driving history database 38 after the last transmission and transmits the probe information to the information delivery center 3. Therefore, as all probe information is once stored in the driving history database 38 without selecting the probe information collected, the collecting process of probe information is accelerated and the processing load of the CPU 41 is reduced.

In the above examples, when receiving the collecting pattern 51D (limiting information) from the information delivery center 3, the CPU 41 (navigation device 2) may store a receiving condition, for example, an area where the vehicle is located when receiving, a day of receiving, and a time of receiving, in the transmitting pattern database 39 together with the collecting pattern 51D. When the CPU 41 judges that the same collecting pattern 51D is received under the same receiving condition for a predefined number of times (for example, 3 to 6 times), and when the receiving condition is met, the CPU 41 may execute the probe information transmitting process indicated in FIG. 6 or in FIG. 10 as the same collecting pattern 51D has been received.

Figure 11:
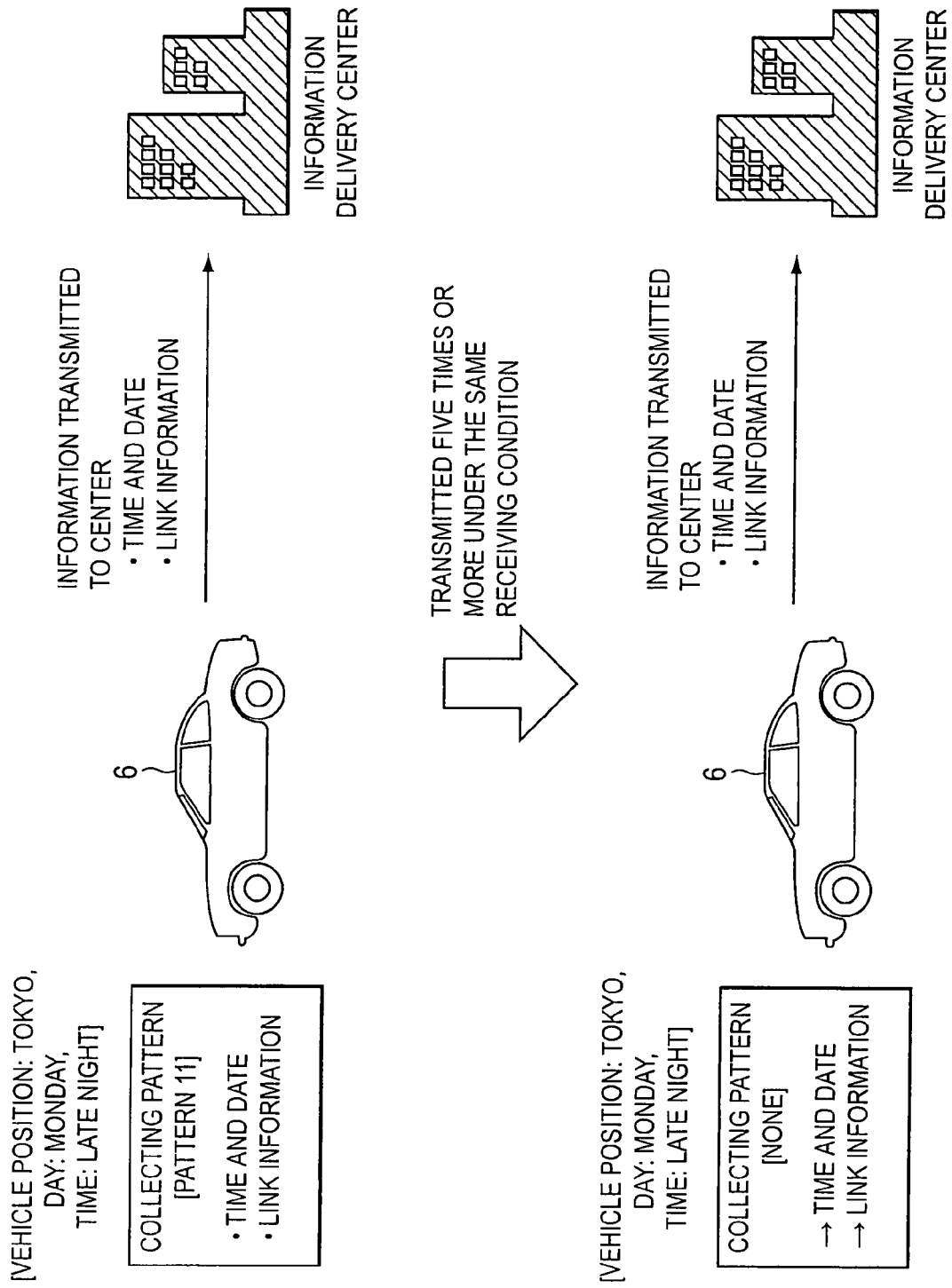
FIG. 11 is an illustration showing an example of receiving and transmitting probe information.

Here, one example is described with reference to FIG. 11. FIG. 11 is an illustration showing one example of the CPU 41 in the navigation device 2 installed on the probe car 6, when "pattern 11" of the collecting pattern 51D has been received under the same receiving condition for 5 times or more and when the receiving condition is met, transmitting the probe information corresponding to the "pattern 11" of the collecting pattern 51D to the information delivery center 3.

As indicated in FIG. 11, while "pattern 11" as the collecting pattern 51D has been received under the same receiving condition of Tokyo as the vehicle location received, Monday as the day received, and late night as the time received, and the probe information of time, date and link information has been collected and transmitted to the information delivery center 3 for 5 times or more in the past, when the probe car 6 is driven in Tokyo on Monday late at night, the CPU 41 may collect the probe information of time, date and link information, and transmit the probe information to the information delivery center 3.

Consequently, the CPU 11 in the information delivery center 3, even when the collecting pattern 51D (limiting information) is not transmitted to the CPU 41 in the navigation device 2, receives the required probe information, and the processing load of the CPU 11 is reduced.

In the above examples, the CPU 41, in S12 above, may transmit the request command for requesting the collecting pattern 51D to the information delivery center 3 together with the information such as vehicle position data, destination coordinate data and a distance to the destination, specifically the driving distance to the destination.

The CPU 11 (information delivery center 3), in S111, receives the request command for requesting the collecting pattern 51D together with the information such as current vehicle position data, destination coordinate data and a distance to the destination, specifically the driving distance to the destination, from the navigation device 2, and stores each piece of information to the RAM 12. The CPU 11 detects a mesh ID of the secondary mesh, which includes the vehicle position based on the vehicle position data received and the map display data stored in the updating map information 14A, and stores the mesh ID to the RAM 12. Then, the CPU 11 may judge whether the distance to the destination is at a predefined distance or further (for example, 10 km or further), and judge whether to execute the processes in and following S112 when the distance to the destination is at the predefined distance or further. Meanwhile, when the distance to the destination is less than the predefined distance, the CPU 11 may select "pattern 8" of the collecting pattern 51D corresponding to the content of transmission data of "stop transmitting all data of the day," and to move on to the process in S115 to transmit the "pattern 8" of the collecting pattern 51D.

Consequently, the CPU 11 in the information delivery center 3 receives highly precise probe information from fewer navigation devices 2 and the processing load of the CPU 11 is further reduced.

Figure 12:
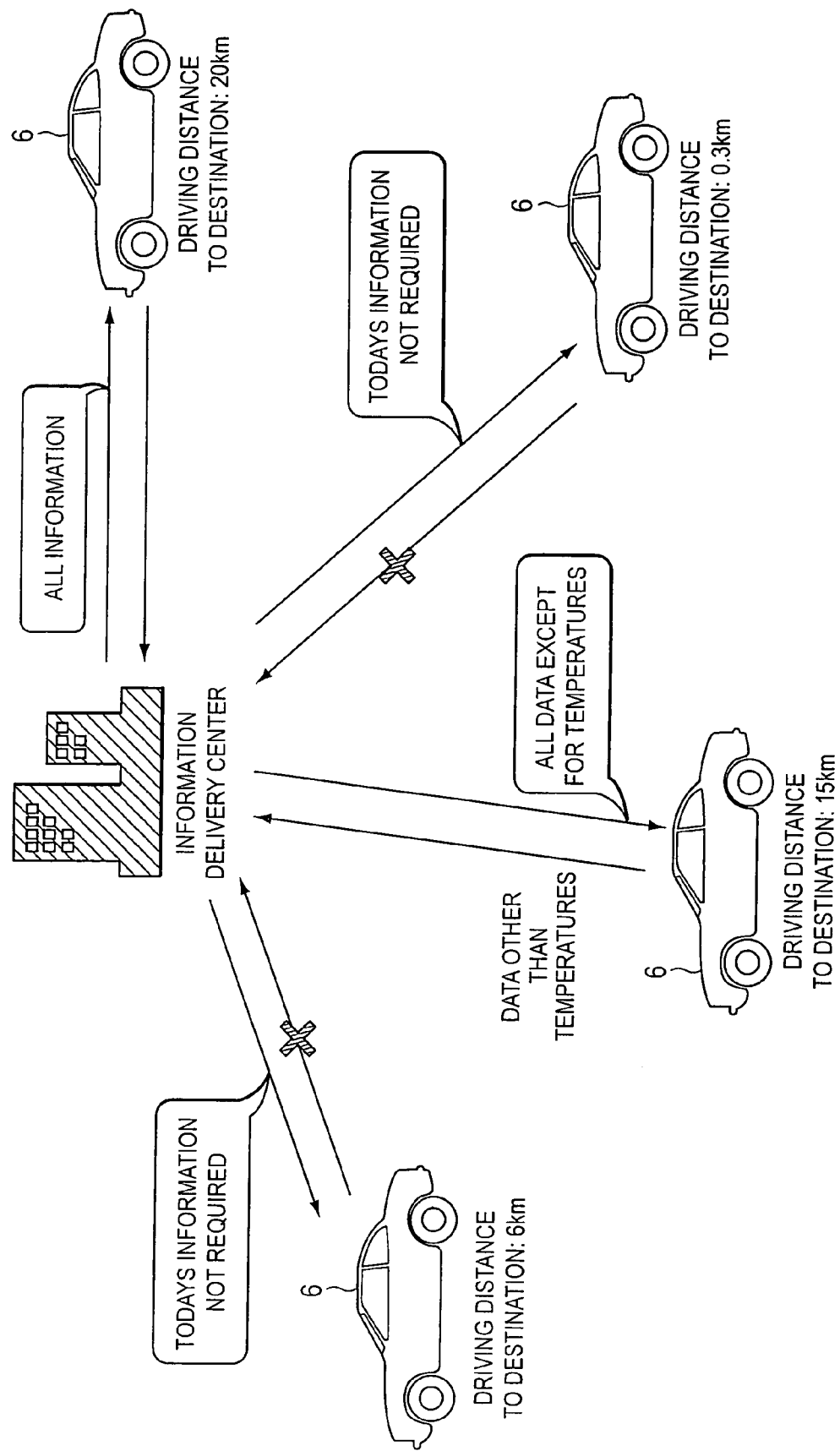
FIG. 12 is an illustration showing an example of the information delivery center instructing each navigation device to enable or to disable transmitting the probe information according to a driving distance to the destination.

Here, one example is described with reference to FIG. 12. FIG. 12 is an illustration showing one example of the CPU 11 in the information delivery center 3 instructing each of the navigation devices 2 to enable and to disable transmitting probe information according to the driving distance to the destination.

As indicated in FIG. 12, when receiving the request command for requesting the collecting pattern 51D together with the driving distance to the destination from the navigation devices 2, the CPU 11 (information delivery center 3) may select the content of transmission data of "stop transmitting all data of the day." Specifically, the "pattern 8" of the collecting pattern 51D corresponding to "today's information not required," and transmit the collecting pattern 51D to the navigation devices 2 whose driving distances to the destination are of 6 km and 0.3 km, which are less than 10 km. Meanwhile, for the navigation devices 2 whose driving distances to the destination are of 15 km and 20 km, which are more than 10 km, the CPU 11 may execute the processes in S112 to S115 described above. For example, the CPU 11 selects and transmits the collecting pattern 51D corresponding to the content of transmission data of "all data except for temperatures" and "all data" to the navigation devices 2 respectively.

In the above examples, when detecting abnormal probe information whose content is greatly different from the contents of other probe information among the probe information for the same link received from the CPU 41 in the navigation device 2 installed on each of the probe cars 6 in a short time period (for example, in 1 to 5 minutes), and in S111 above, when receiving the requesting command for requesting the collecting pattern 51D from the CPU 41 in the navigation device 2 which transmitted the abnormal probe information, the CPU 11 (information delivery center 3) may select the "pattern 8" of the collecting pattern 51D corresponding to the content of transmission data of "stop transmitting all data of the day," and may transmit the "pattern 8" of the collecting pattern 51D to the navigation device 2. Specifically, the CPU 11 may be configured to instruct the CPU 41 in the navigation device 2, which transmitted the abnormal probe information, to stop transmitting further probe information.

Consequently, the CPU 11 in the information delivery center 3 receives highly precise probe information from fewer navigation devices 2, and the processing load of the CPU 11 is reduced.

Figure 13:
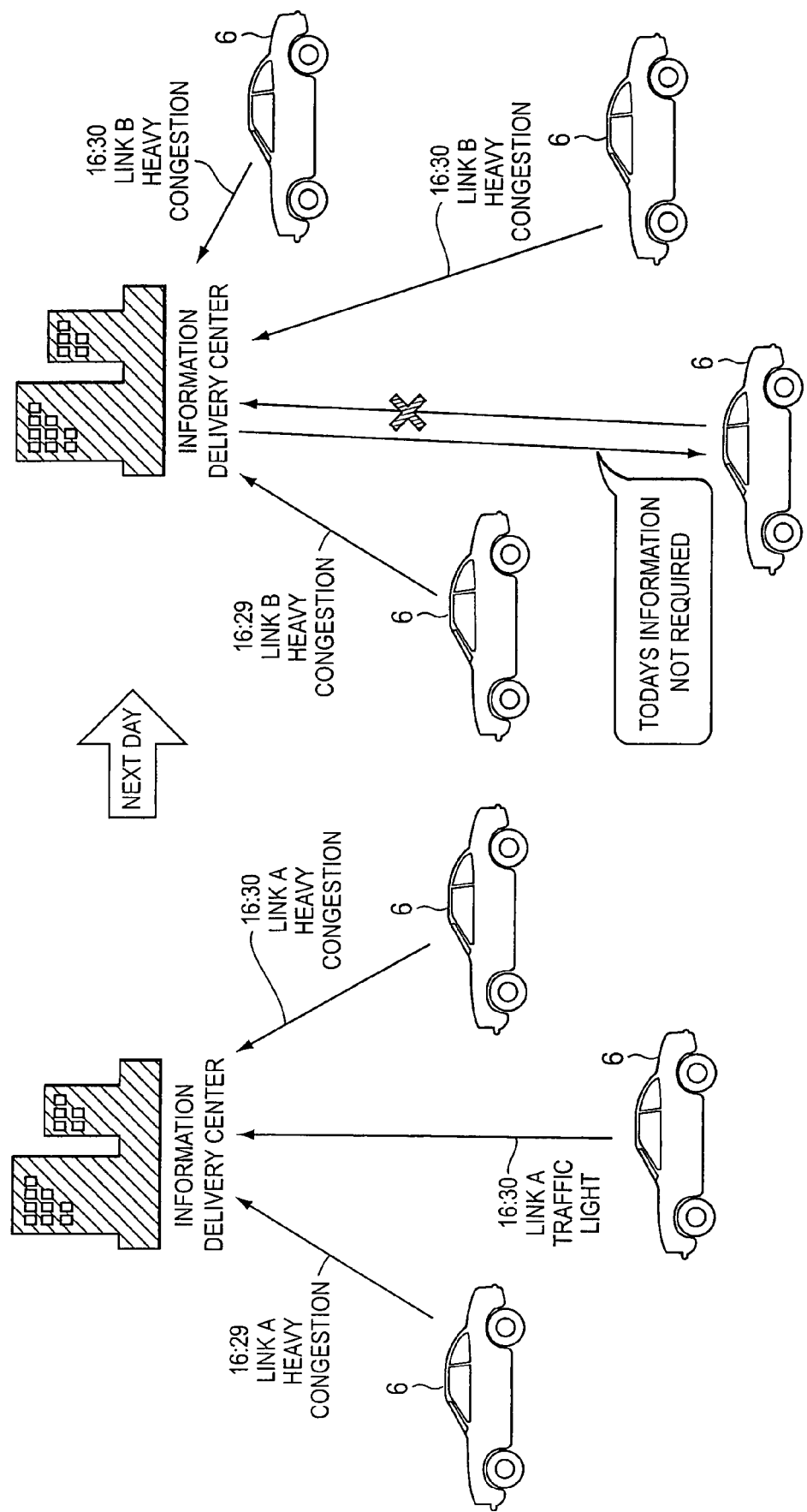
FIG. 13 is an illustration showing an example of the information delivery center instructing a navigation device that transmitted abnormal probe information to stop transmitting the probe information.

Here, one example is described with reference to FIG. 13. FIG. 13 is an illustration showing one example of the CPU 11 in the information delivery center 3 instructing the CPU 41 in the navigation device 2 which transmitted such abnormal probe information to stop transmitting further probe information.

As indicated in FIG. 13, the CPU 11 in the information delivery center 3, when receiving three sets of probe information including traffic conditions (i.e., traveling time, degree of congestion, driving speed and such) relating to link A from probe cars 6 in a short time period from 16:29 to 16:30, and two sets of the probe information indicate the congestion degree of "heavy congestion" with a driving speed of less than 5 km/hour while one set of the probe information indicates the congestion degree of "light traffic" with a driving speed of 20 km/hour or more, may judge the probe information of the congestion degree of "light traffic" as abnormal probe information.

The CPU 11, when receiving the request command for requesting the collecting pattern 51D from the CPU 41 in the navigation device 2 which transmitted the abnormal probe information of the congestion degree of "light traffic," may select "pattern 8" of the collecting pattern 51D corresponding to the content of transmission data of "stop transmitting all data of the day" and may transmit the "pattern 8" of the collecting pattern 51D. Specifically, the CPU 11 in the information delivery center 3 may be configured to instruct the CPU 41 in the navigation device 2, which transmitted the abnormal probe information, to stop transmitting further probe information. The CPU 11 may be configured to collect the probe information from the other navigation devices 2 than the navigation device 2 which transmitted the abnormal probe information.

In the above examples, the collecting pattern data 51 may be configured to store the collecting pattern 51D by time and date as the period 51A (seasonal factor) and prefectures as the areas of 51B and 51C (regional factor), days and seasons, weekdays of "Monday to Friday" and holidays of "Saturdays, Sundays, and holidays" may be used for period classification in place of time and date, and areas such as administrative sections of municipality and map mesh IDs may be used for area classification.

While the collecting pattern data 51 is configured to store the collecting pattern 51D by time and date as the period 51A (seasonal factor) and prefectures as the areas of 51B and 51C (regional factor), the collecting pattern 51D may be configured to correspond further to at least one of the factors of weather (weather factor), temperatures (weather factor), the type of the vehicle on which the navigation device 2 is installed such as vehicle types of less than one year from its introduction and that of one year or more from its introduction, conditions of road surfaces, and road categories such as "expressways/toll roads," "general roads," and "narrow streets."

In the above examples, when the ignition switch is turned on in S11 above, the CPU 41 is configured to request the collecting pattern 51D from the information delivery center 3 in S12. However, the CPU 41 may be configured to request the collecting pattern 51D from the information delivery center 3 when the ignition switch is turned on and on a predefined day, date and at a predefined time. For example, for the predefined day, date and time, a specific day such as Mondays may be used. When the collecting pattern 51D received is given with the period 51A, the time and date after the specified period 51A expires or the time and date one week after receiving the previous collecting pattern 51D may be used.

What is claimed is:

1. A navigation device for use with an information center that receives probe information and position data transmitted from the navigation device, the information center configured to store collecting patterns, each stored collecting pattern indicating what type of probe information should be transmitted and having at least one associated seasonal factor and at least one associated regional factor, specify a seasonal factor and a regional factor corresponding to the navigation device, select a stored collection pattern based on the specified seasonal factor and the specified regional factor, and transmit the selected collecting pattern to the navigation device, the navigation device comprising:
   a memory that stores a history of received collecting patterns corresponding to a receiving condition; and
   a controller that:
      collects probe information;
      based on the stored history, judges whether a same collecting pattern has been received under a same receiving condition for a predefined number of times;
      if the same collecting pattern has been received under the same receiving condition for the predefined number of times, selects only the probe information specified by the same collecting pattern for transmission to the information center whenever the receiving condition is met; and
   a transmitter that transmits the selected probe information to the information center.

2. The navigation device according to claim 1, wherein the information center is configured to receive destination distance information transmitted from the navigation device and the selected collecting pattern enables or disables the navigation device to transmit the probe information based on the received distance information, wherein:
   the controller calculates a distance to a preset destination; and
   the transmitter transmits the calculated distance to the information center as the destination distance information.

3. The navigation device according to claim 1, wherein the receiver is a cellular receiver and the transmitter is a cellular transmitter.

4. A navigation system comprising:
   the navigation device of claim 1; and
   the information center.

5. The navigation device according to claim 1, wherein each stored collecting pattern indicates whether or not one or more of the following types of probe information should be transmitted by the transmitter:
   an operating state of a braking system;
   traffic congestion information;
   probe information for certain types of roads; and
   probe information collected on certain days.

* * * * *